(12) United States Patent
Tavildar et al.

(10) Patent No.: US 9,049,668 B2
(45) Date of Patent: Jun. 2, 2015

(54) D2D RELAYS AS AN UNDERLAY IN LTE UPLINK

(75) Inventors: Saurabh R. Tavildar, Jersey City, NJ (US); Bilal Sadiq, Somerville, NJ (US); Libin Jiang, Bridgewater, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 260 days.

(21) Appl. No.: 13/605,753

(22) Filed: Sep. 6, 2012

(65) Prior Publication Data

US 2014/0066119 A1    Mar. 6, 2014

(51) Int. Cl.
*H04W 52/38* (2009.01)
*H04W 52/24* (2009.01)
*H04W 52/46* (2009.01)
*H04W 88/04* (2009.01)

(52) U.S. Cl.
CPC ............ *H04W 52/243* (2013.01); *H04W 52/46* (2013.01); *H04W 88/04* (2013.01); *Y02B 60/50* (2013.01)

(58) Field of Classification Search
None
See application file for complete search history.

(56) References Cited

U.S. PATENT DOCUMENTS

| | | | |
|---|---|---|---|
| 7,961,670 B2 | 6/2011 | Park et al. | |
| 8,169,919 B2 | 5/2012 | Suh et al. | |
| 8,199,721 B2 | 6/2012 | Jung et al. | |
| 2007/0076684 A1 | 4/2007 | Lee et al. | |
| 2007/0214286 A1 | 9/2007 | Muqattash et al. | |
| 2008/0057973 A1 | 3/2008 | Park | |
| 2008/0227461 A1 | 9/2008 | Dayal et al. | |
| 2009/0270109 A1* | 10/2009 | Wang Helmersson et al. | 455/453 |
| 2009/0325625 A1 | 12/2009 | Hugl et al. | |
| 2010/0039947 A1 | 2/2010 | Li et al. | |
| 2010/0067427 A1 | 3/2010 | Choudhury | |
| 2010/0142433 A1 | 6/2010 | Womack et al. | |
| 2010/0157845 A1 | 6/2010 | Womack et al. | |
| 2010/0167743 A1 | 7/2010 | Palanki et al. | |
| 2010/0261426 A1 | 10/2010 | Shin et al. | |
| 2010/0261480 A1 | 10/2010 | Cho et al. | |
| 2011/0117907 A1 | 5/2011 | Hooli et al. | |
| 2011/0149769 A1 | 6/2011 | Nagaraja | |
| 2011/0228680 A1* | 9/2011 | Ball et al. | 370/241 |

(Continued)

FOREIGN PATENT DOCUMENTS

| | | |
|---|---|---|
| EP | 1890440 A2 | 2/2008 |
| WO | WO-2010078210 | 7/2010 |
| WO | WO-2011129654 A2 | 10/2011 |

OTHER PUBLICATIONS

Fodor, et al., "Design aspects of network assisted device-to-device communications," IEEE Communications Magazine, Mar. 2012, vol. 50; Issue. 3, pp. 170-177.

(Continued)

*Primary Examiner* — Philip Sobutka
(74) *Attorney, Agent, or Firm* — James K. O'Hare

(57) ABSTRACT

A method, an apparatus, and a computer program product for wireless communication are provided. The apparatus obtains at least one of a pathloss measurement to a base station or a maximum tolerable interference to the base station, determines a maximum transmission power for an access link to a user equipment (UE) based on the at least one of the pathloss measurement or the maximum tolerable interference to the base station, and communicates on the access link to the UE at a transmission power less than the determined maximum transmission power.

32 Claims, 14 Drawing Sheets

(56) References Cited

U.S. PATENT DOCUMENTS

| | | |
|---|---|---|
| 2011/0256827 A1 | 10/2011 | Hart |
| 2011/0310747 A1 | 12/2011 | Seo et al. |
| 2012/0236783 A1 | 9/2012 | Park et al. |
| 2012/0265818 A1 | 10/2012 | Van Phan et al. |
| 2013/0016630 A1 | 1/2013 | Bhushan et al. |
| 2013/0021932 A1 | 1/2013 | Damnjanovic et al. |
| 2013/0083722 A1 | 4/2013 | Bhargava et al. |
| 2013/0165127 A1 | 6/2013 | Ikegami |
| 2013/0244715 A1 | 9/2013 | Kwon et al. |
| 2014/0112162 A1 | 4/2014 | Tavildar et al. |
| 2014/0329535 A1 | 11/2014 | Sadiq et al. |

OTHER PUBLICATIONS

Gkatzikis L., et al., "Low complexity algorithms for relay selection and power control in interference-limited environments," Modeling and Optimization in Mobile, Ad Hoc and Wireless Networks (WIOPT), 2010 Proceedings of the 8th International Symposium on, IEEE, Piscataway, NJ, USA, May 31, 2010, pp. 278-287, XP031714617, ISBN: 978-1-4244-7523-0.

International Search Report and Written Opinion—PCT/US2013/058549—ISA/EPO—Nov. 8, 2013.

Lei L., et al., "Operator controlled device-to-device communications in LTE-advanced networks", IEEE Wireless Communications, IEEE Service Center, Piscataway, NJ, US, vol. 19, No. 3, Jun. 1, 2012, pp. 96-104, XP011480414, ISSN: 1536-1284, DOI: 10.1109/MWC.2012.6231164 p. 3-p. 7.

Calcev, et al., "Opportunistic two-hop relays for OFDMA cellular networks," 2008 IEEE GLOBECOM Workshops, Nov. 2008, pp. 1-6.

Karaer et al., "Uplink performance optimization in relay enhanced LTE-Advanced networks," IEEE 20th International Symposium Personal, Indoor and Mobile Radio Communications, Sep. 2009, pp. 360-364.

Raghothaman, et al. "System Architecture for a Cellular Network with Cooperative Mobile Relay," Vehicular Technology Conference (VTC Fall), 2011 IEEE, pp. 1-5.

Vanganuru, et al., "Uplink system capacity of a cellular network with cooperative mobile relay," Wireless Telecommunications Symposium (WTS), Apr. 2011, pp. 1-7.

"3rd Generation Partnership Project; Technical Specification Group Services and System Aspects; Service requirements for the Evolved Packet System (EPS)", Release 12, 3GPP Standars; 3GPP TS 22.278, 3rd Generation Partnership Project (3GPP), Mobile Competence Centre; 650, Route des Lucioles; F-06921 Sophia-Antipolis Cedex; France, vol. SA WG1, No. V12.2.0, Mar. 15, 2013, pp. 1-42, XP050692129, [retrieved on Mar. 15, 2013] p. 25, line 17-line 41.

LG Electronics et al., "Some Issues to consider for ProSe UE-to-UE Relay", 3GPP Draft; Draft S1-133101 LGE-Disc Some Issues to Consider for Prose UE-to-UE Relay V02, 3rd Generation Partnership Project (3GPP), Mobile Competence Centre; 650, Route des Lucioles; F-06921 Sophi vol. SA WG1, no. New Dehli, India; May 6, 2013-May 10, 2013 Apr. 26, 2013, pp. 1-3, XP050707548, Retrieved from the Internet: URL: http://www.3gpp.org/ftp/tsg_sa/WG1_Serv/TSGS1_62_New_Delhi/docs/ [retrieved—on Apr. 26, 2013] section 2-section 3.

* cited by examiner

D2D RELAYS AS AN UNDERLAY IN LTE UPLINK

BACKGROUND

1. Field

The present disclosure relates generally to communication systems, and more particularly, to an access link between a relay user equipment (UE) and an edge UE using an uplink spectrum in an underlay manner with respect to uplink transmissions in a long term evolution (LTE) communication system.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is LTE. LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus obtains at least one of a pathloss measurement to a base station or a maximum tolerable interference to the base station; determines a maximum transmission power for an access link to a user equipment (UE) based on the at least one of the pathloss measurement or the maximum tolerable interference to the base station; and communicates on the access link to the UE at a transmission power less than the determined maximum transmission power. The maximum transmission power for the access link may be a sum of the maximum tolerable interference to the base station and the pathloss measurement. The maximum tolerable interference may be obtained from the base station. Communicating on the access link to the UE may be performed using an uplink spectrum. The access link may have a pathloss of less than 100 dB.

In an aspect, the apparatus determines the maximum transmission power for the access link by determining an uplink transmission power to the base station based on the pathloss measurement; determining the maximum transmission power for the access link by applying a backoff to the determined uplink transmission power; and reducing the transmission power for the access link to match a rate on a backhaul link. Applying the backoff may include subtracting at least 20 dB from the determined uplink transmission power.

DETAILED DESCRIPTION

Figure 1:
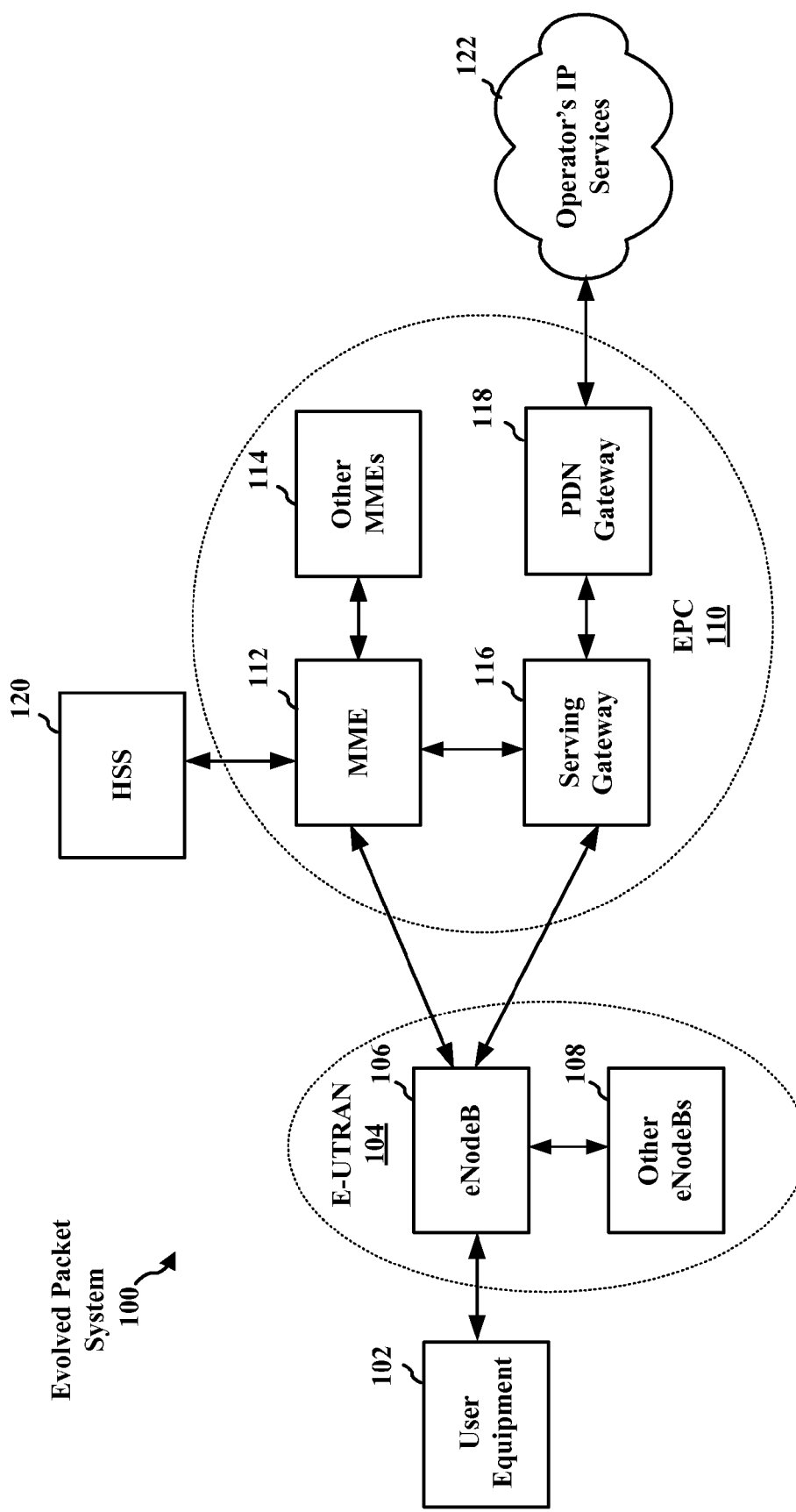
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
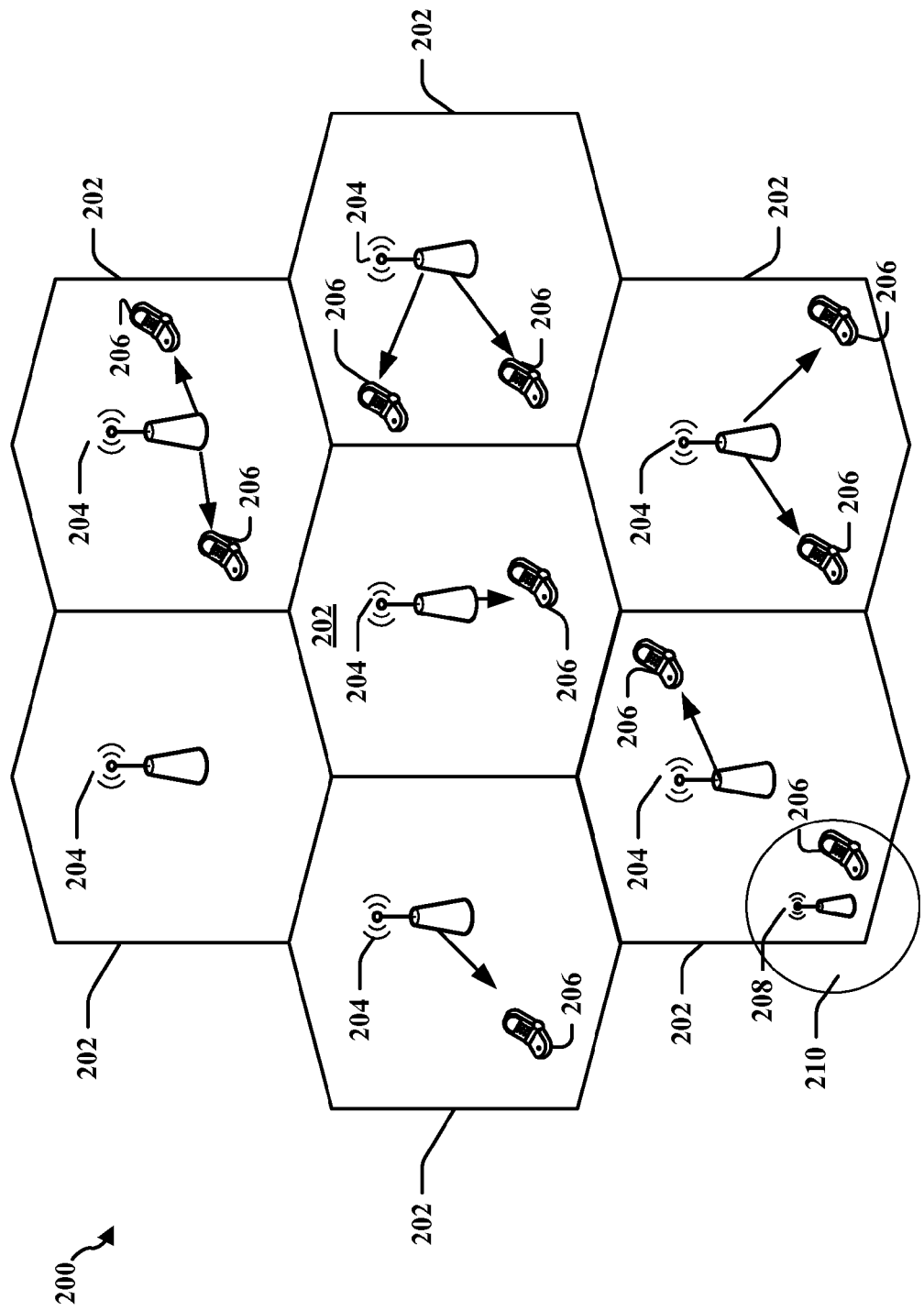
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
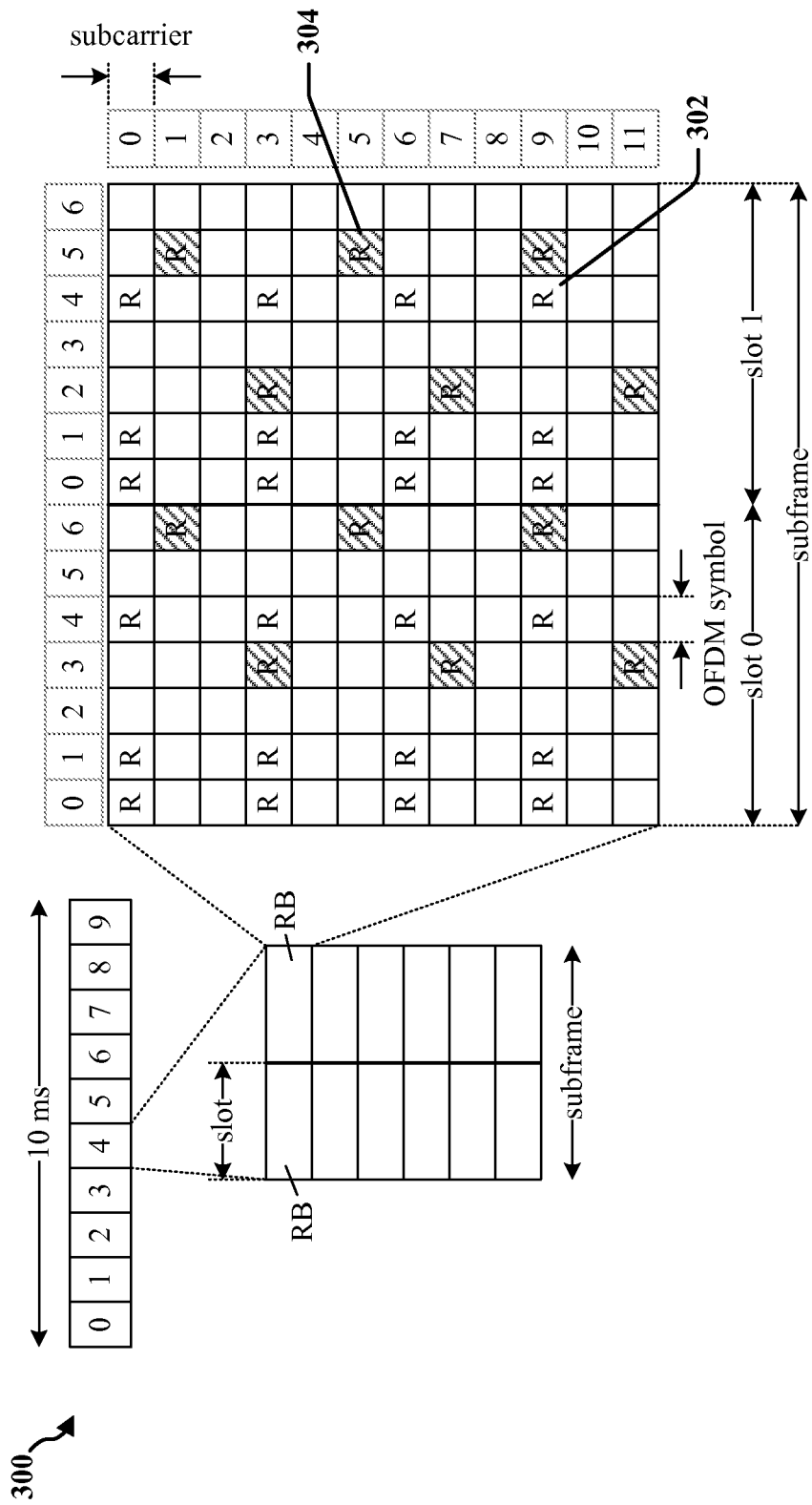
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
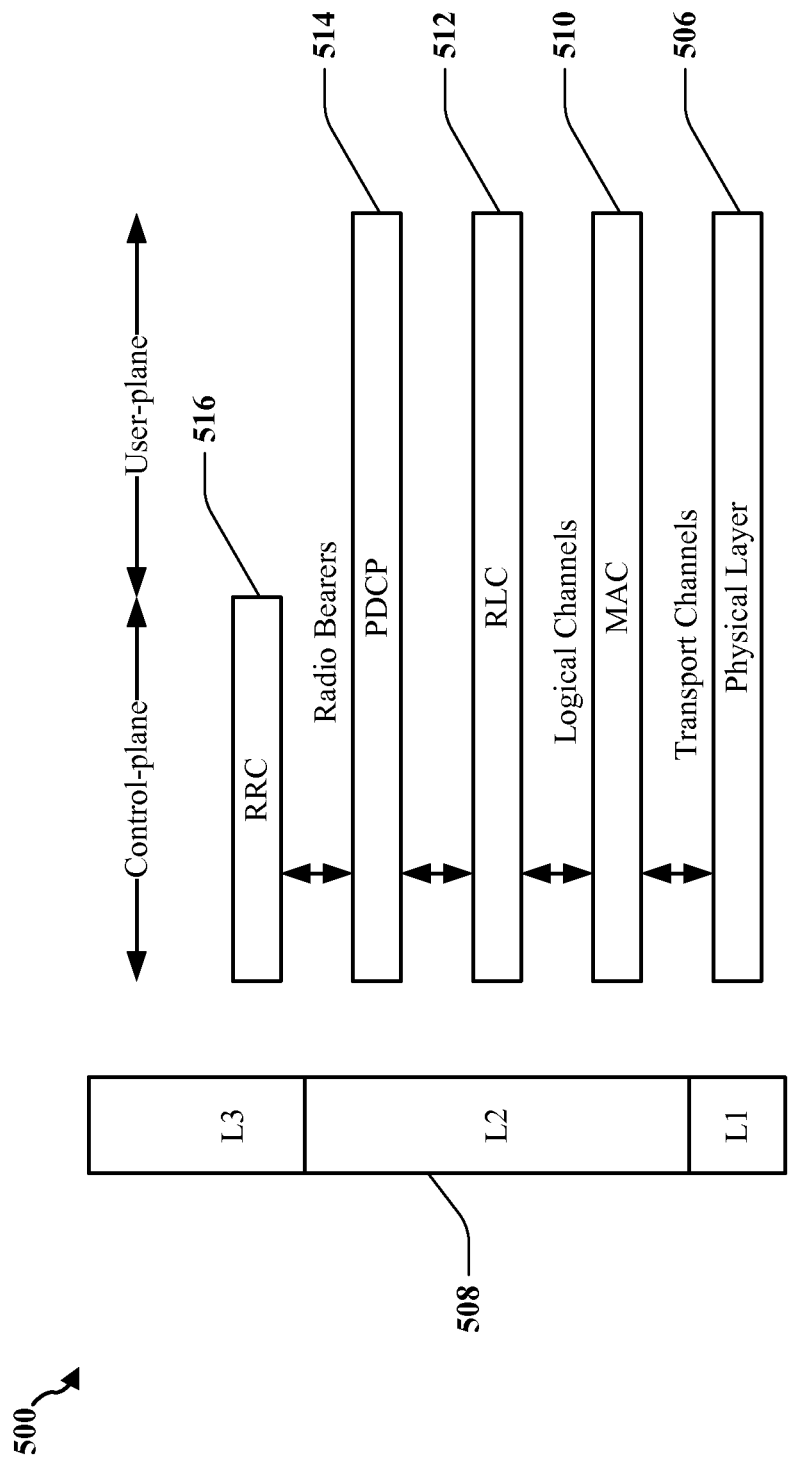
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
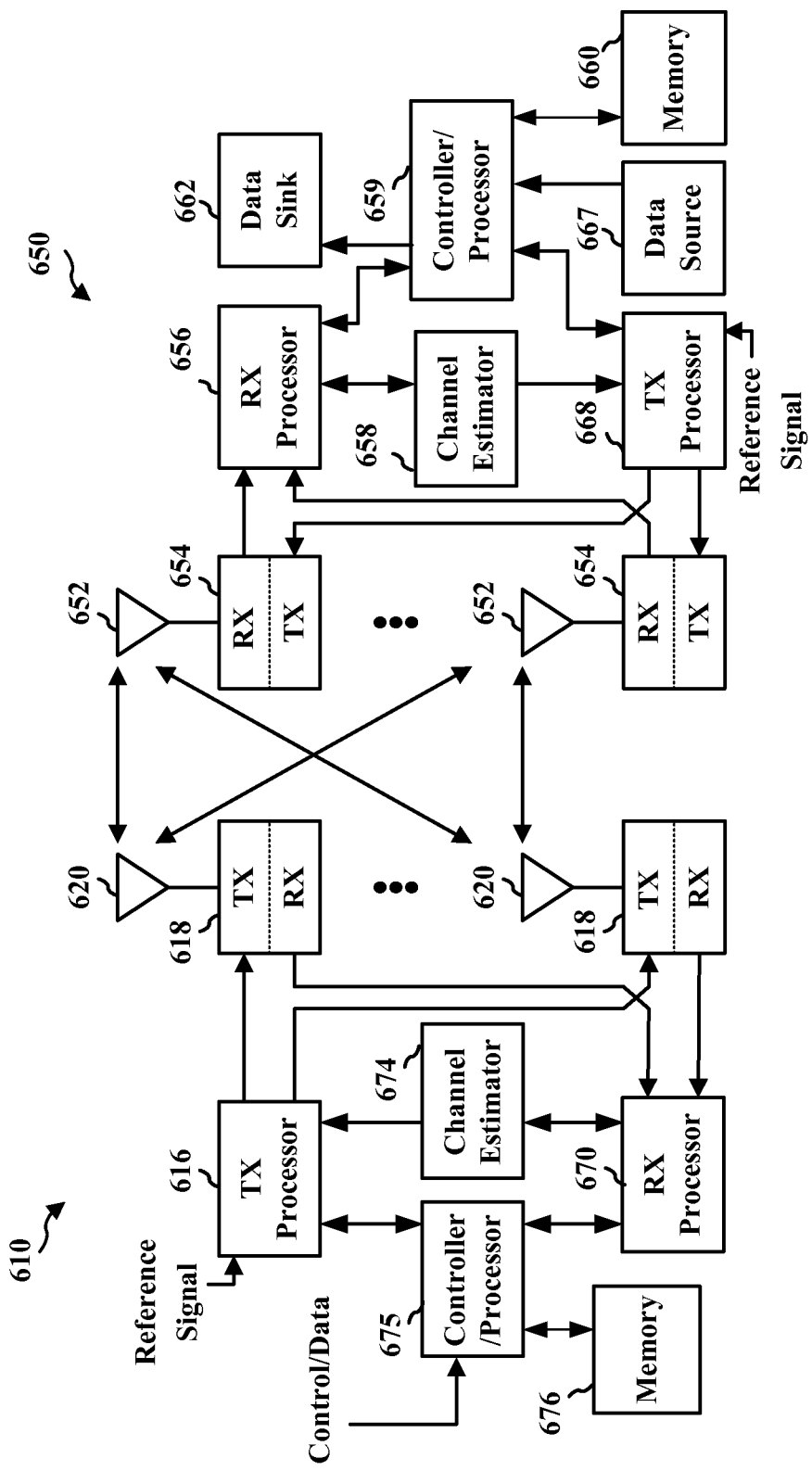
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
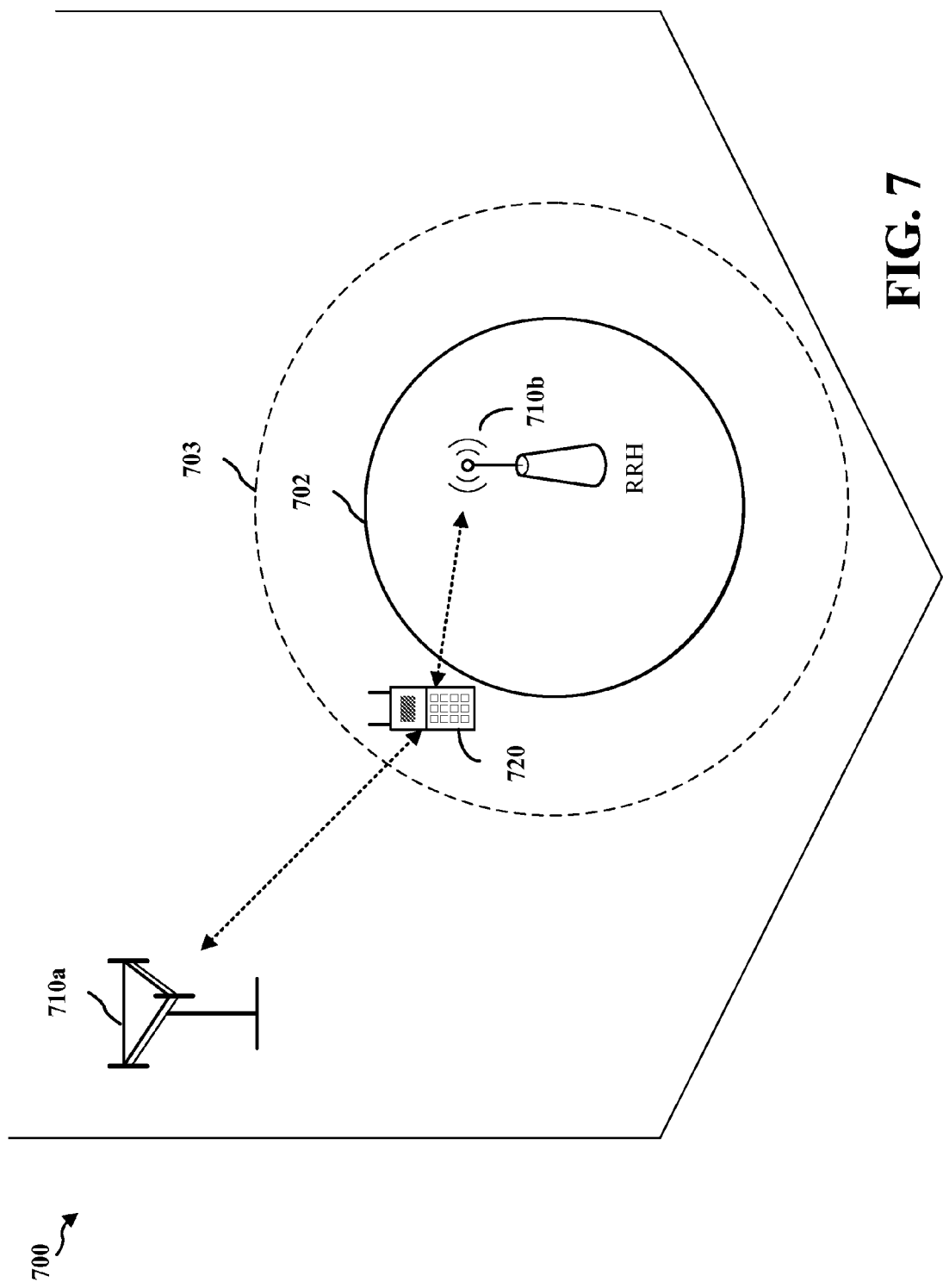
FIG. 7 is a diagram illustrating a range expanded cellular region in a heterogeneous network.

FIG. 7 is a diagram 700 illustrating a range expanded cellular region in a heterogeneous network. A lower power class eNB such as the RRH 710b may have a range expanded cellular region 703 that is expanded from the cellular region 702 through enhanced inter-cell interference coordination between the RRH 710b and the macro eNB 710a and through interference cancellation performed by the UE 720. In enhanced inter-cell interference coordination, the RRH 710b receives information from the macro eNB 710a regarding an interference condition of the UE 720. The information allows the RRH 710b to serve the UE 720 in the range expanded cellular region 703 and to accept a handoff of the UE 720 from the macro eNB 710a as the UE 720 enters the range expanded cellular region 703.

Figure 8:
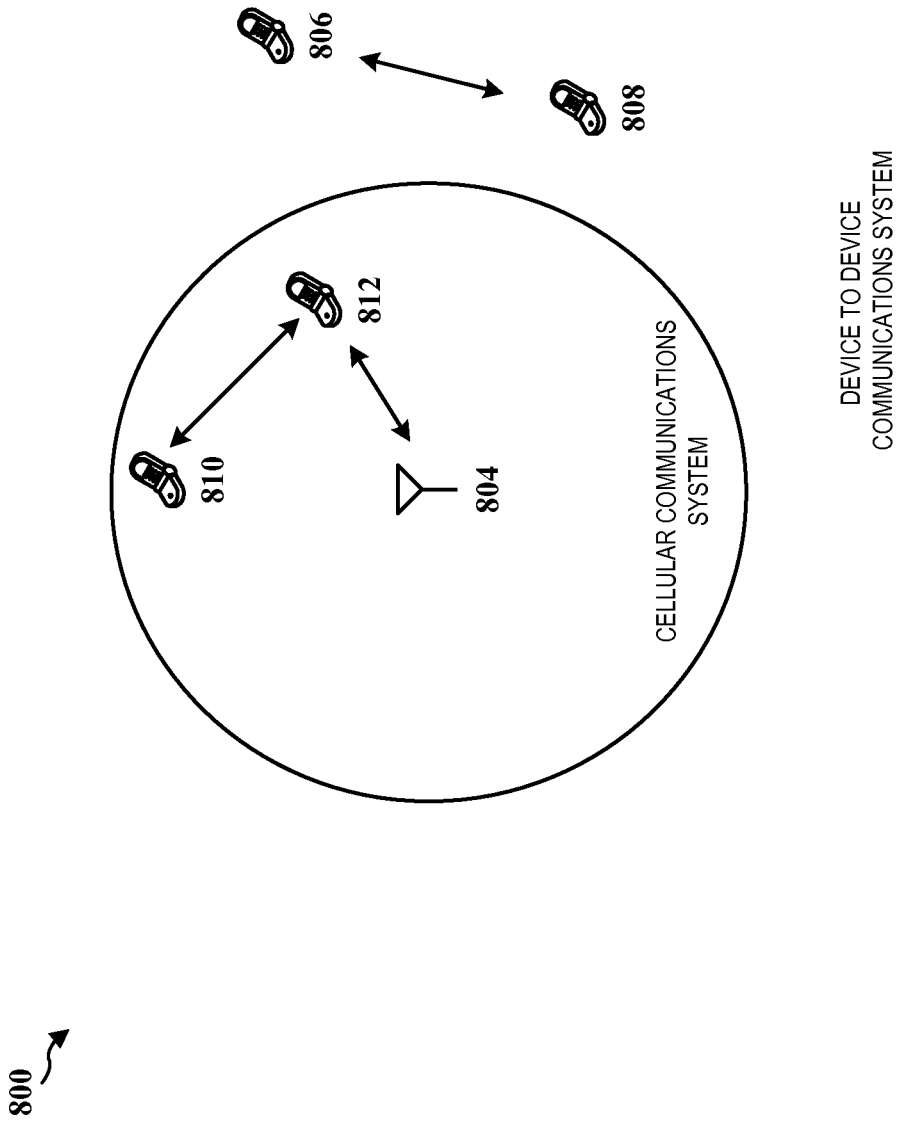
FIG. 8 is a diagram of an exemplary device-to-device (D2D) communications system.

FIG. 8 is a diagram 800 of an exemplary device-to-device (D2D) communications system. The device-to-device communications system 800 includes a plurality of wireless devices 806, 808, 810, 812. The device-to-device communications system 800 may overlap with a cellular communications system, such as for example, a wireless wide area network (WWAN). Some of the wireless devices 806, 808, 810, 812 may communicate together in device-to-device communication, some may communicate with the base station 804, and some may do both. For example, as shown in FIG. 8, the wireless devices 806, 808 are in device-to-device communication and the wireless devices 810, 812 are in device-to-device communication. The wireless device 812 is also communicating with the base station 804.

The wireless device may alternatively be referred to by those skilled in the art as user equipment (UE), a mobile station, a subscriber station, a mobile unit, a subscriber unit, a wireless unit, a wireless node, a remote unit, a mobile device, a wireless communication device, a remote device, a mobile subscriber station, an access terminal, a mobile terminal, a wireless terminal, a remote terminal, a handset, a user agent, a mobile client, a client, or some other suitable terminology. The base station may alternatively be referred to by those skilled in the art as an access point, a base transceiver station, a radio base station, a radio transceiver, a transceiver function, a basic service set (BSS), an extended service set (ESS), a Node B, an evolved Node B, or some other suitable terminology.

The exemplary methods and apparatuses discussed infra are applicable to any of a variety of wireless device-to-device communications systems, such as for example, a wireless device-to-device communication system based on FlashLinQ, WiMedia, Bluetooth, ZigBee, or Wi-Fi based on the IEEE 802.11 standard. One of ordinary skill in the art would understand that the exemplary methods and apparatuses are applicable more generally to a variety of other wireless device-to-device communication systems.

An LTE communication system may utilize relays to facilitate communication between a UE and a base station. Current relays are similar to base stations, and essentially split a UE-base station link into two links: 1) an access link; and 2) a backhaul link. The access link refers to the link between an edge UE and the relay. The backhaul link refers to the link between the relay and the base station. If the relay is positioned reasonably well, then a signal strength on the backhaul link can be much stronger than a signal strength on an actual direct link between the base station and the edge UE. Hence, system throughput will be improved. In an aspect, D2D technology may be utilized for relaying in an LTE communication system. This may include using a UE as the relay, and implementing a new relay architecture between a relay UE and an edge UE.

Figure 9:
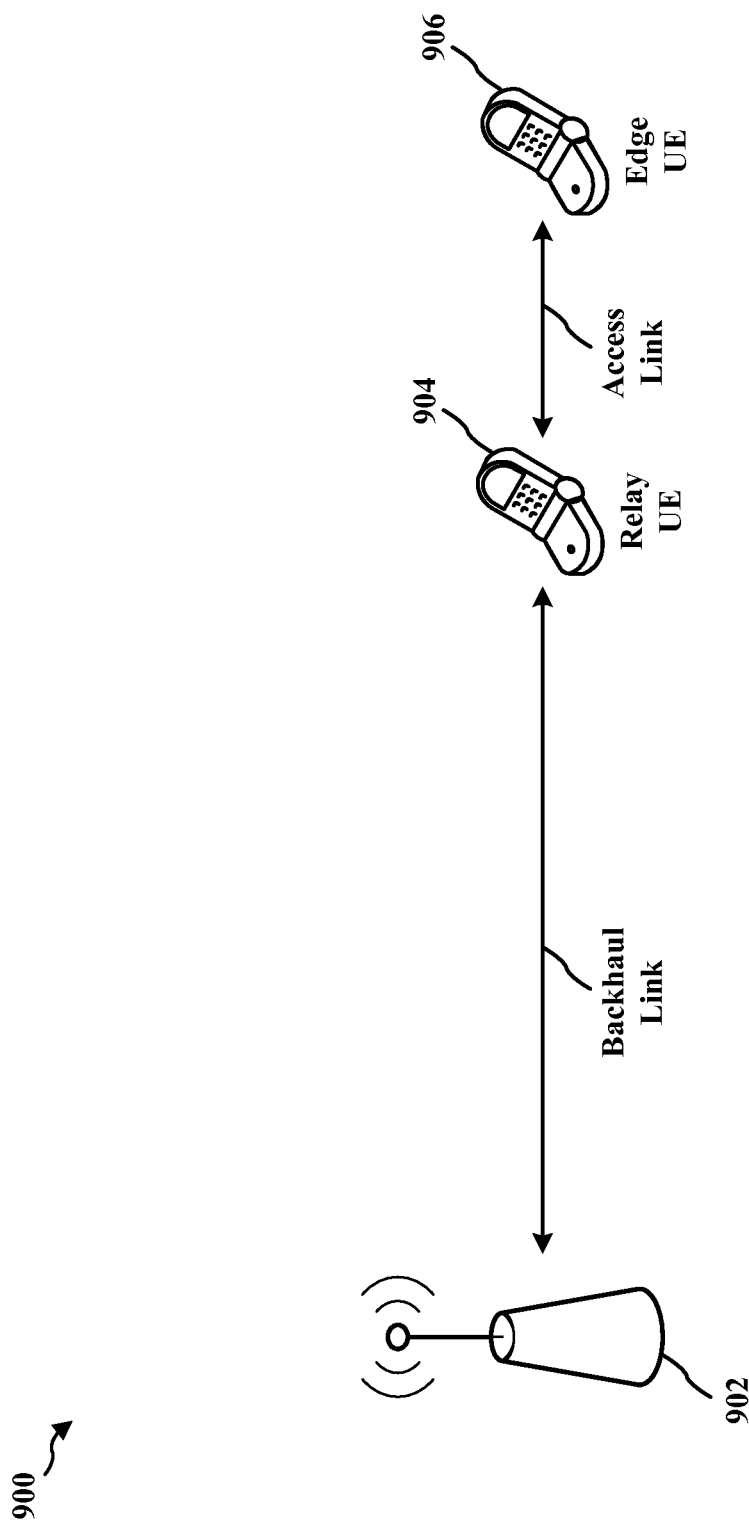
FIG. 9 is a diagram illustrating exemplary relaying in a communication system.

FIG. 9 is a diagram 900 illustrating exemplary relaying in a communication system. A communication link between an eNB 902 and a relay UE 904 may be referred to as a backhaul link. A communication link between the relay UE 904 and an edge UE 906 may be referred to as an access link. In the disclosure, the edge UE may refer to a UE at the edge of a cell. However, the edge UE may also refer to any UE other than the relay UE.

Idle user equipments (UEs) may be used as relays in an LTE communication system. In the present disclosure, a design of an access link protocol is provided that manages interference to the backhaul link as relays may be backhaul-limited in LTE. In an aspect, the access link between the relay UE 904 and the edge UE 906 may use an uplink spectrum in an underlay manner with respect to LTE uplink transmissions. Accordingly, no orthogonal resources may be needed.

The access link may be in-band. That is, the access link may use only uplink resources. The uplink resources may be fully reused on each access link as an underlay to LTE uplink transmissions. This means that the access link may be explicitly power-controlled to a donor eNB to manage interference observed by the eNB.

Figure 10:
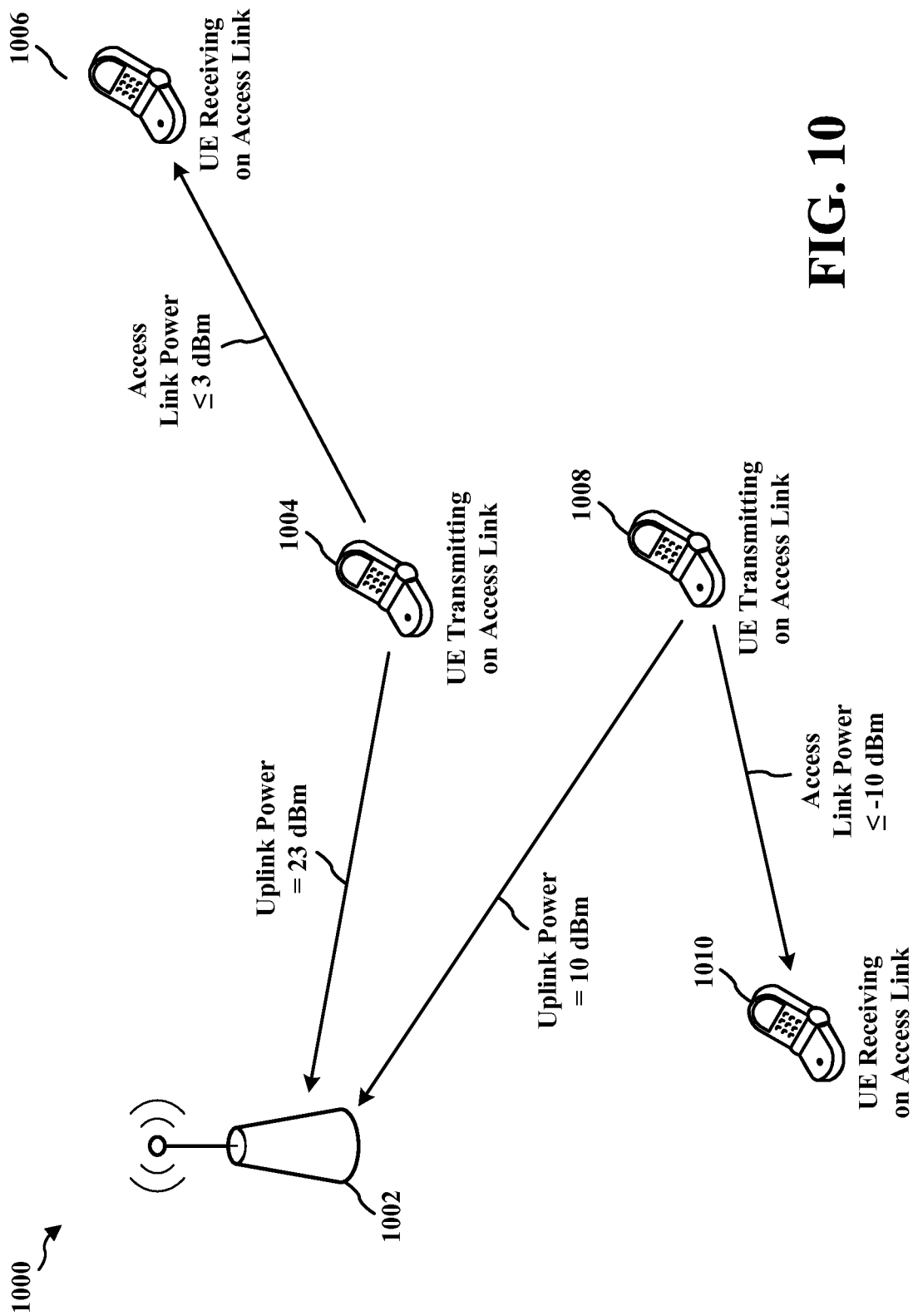
FIG. 10 is a diagram illustrating power control of an access link.

FIG. 10 is a diagram 1000 illustrating power control of an access link. The transmission power of a UE (relay UE or edge UE) on the access link may be limited to an uplink power the UE may have used for transmitting to the eNB minus an arbitrary backoff, such as 20 dB for example. Referring to FIG. 10, the UE 1004 may transmit to the eNB 1002 at an uplink power of 23 dBm. Accordingly, the power on the access link between the UE 1004 and the UE 1006 may be limited to less than or equal to 3 dBm (23 dBm−20 dB=3 dBm). In another example, the UE 1008 may transmit to the eNB 1002 at an uplink power of 10 dBm. Thus, the power on the access link between the UE 1008 and the UE 1010 may be limited to less than or equal to −10 dBm (10 dBm−20 dB=−10 dBm).

Power control of the access link allows the access link to use an entire uplink spectrum at the same time as an uplink transmission without causing interference to backhaul or legacy transmissions. Because relaying is typically useful for cell-edge UEs, even with the constraint described above, the access link may still be useful as long as the access link is within a predetermined length. By keeping the access link within the predetermined length, an interference observed by the access link due to LTE uplink transmissions may be managed.

In an aspect, opportunistic relaying may be enabled by a high density UE deployment. Moreover, no eNB implementation is needed at the relay UE. Also, UE discovery may be optimized to reduce power penalty and pilot pollution.

When selecting a relay, a selecting UE may consider relay UE candidates with an 85 dB or lower pathloss (PL) compared to the selecting UE. For example, under a pathloss model 30+40 log(d), a maximum access link length is approximately 25 m. A maximum pathloss may be much smaller than a link budget due to the underlay approach.

Among the relay UE candidates, the selecting UE may select the relay UE with the best downlink signal-to-interference- and noise ratio (SINR). Thus, the relay UEs have better backhaul rates. Multiuser diversity may be harvested even from idle UEs, at the scale of shadowing (e.g., going outside or near a window for a better signal).

A maximum transmission power (Tx power) on the access link by a UE (edge or relay) may be derived from the uplink Tx Power of that UE. Hence, maximum access link Tx power=(uplink Tx power−20 dB). An actual access link Tx power may be even lower. For example, the actual access link Tx power may be equal to the power needed to match a rate on the backhaul. According to simulations performed, an average backoff from the uplink Tx power may be approximately 27 dB.

Inter-cell interference (ICI) in the uplink is reduced by the use of relay UEs in the uplink. This reduced ICI to the uplink makes up for the interference introduced by the underlay. Because relay UEs have better channels, the relay UEs transmit in the uplink at a power lower than the power edge UEs would have used to transmit to the eNB. This reduces interference to neighboring cells. Overall, uplink traffic stands to gain from the relay UEs because the relay UEs can invert more pathloss due to their having better channels than the edge UEs.

In an aspect, the eNB may optionally broadcast a maximum tolerable interference from the relay UE. The relay UE may then determine a maximum transmit power based on a pathloss measurement and the maximum tolerable interference. The relay UE communicates on the access link with an edge UE using the determined maximum transmit power. The relay UE may further reduce the transmit power on the access link to meet a rate on a backhaul link to the eNB to avoid interference to the backhaul link or legacy links.

Figure 11:
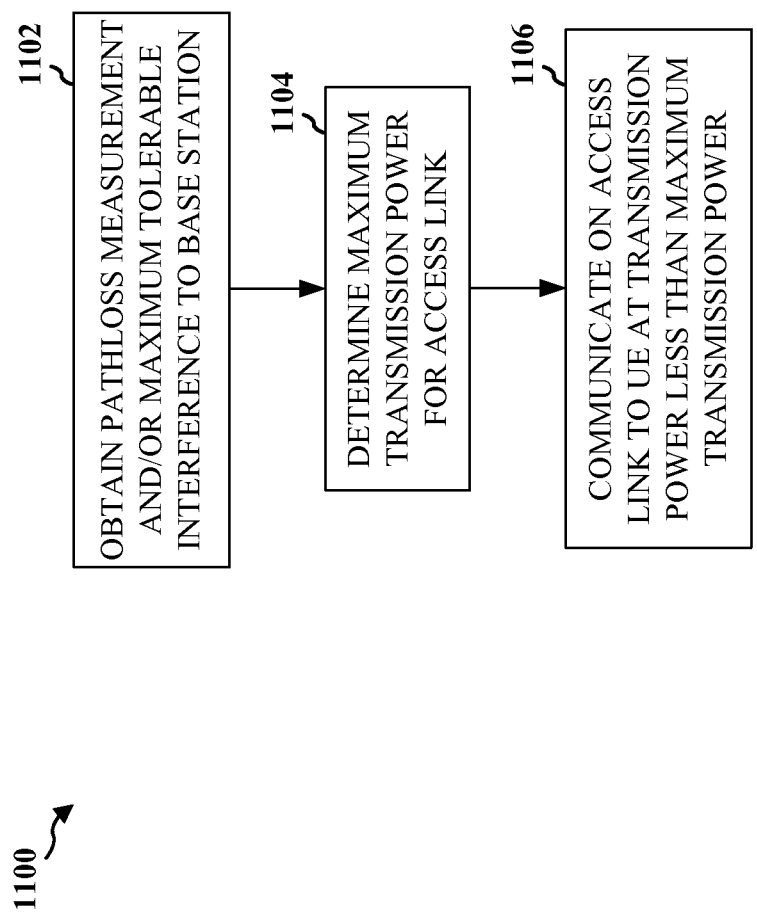
FIG. 11 is a flow chart of a method of wireless communication.

FIG. 11 is a flow chart 1100 of a method wireless communication. The method may performed by a relay, such as a relay UE. The method may also be performed by a UE on either end of an access link. At step 1102, the relay UE may obtain a pathloss measurement to a base station. Alternatively, the UE may obtain a maximum tolerable interference to the base station. In an aspect, the maximum tolerable interference may be obtained from the base station.

At step 1104, the relay UE determines a maximum transmission power for an access link to an edge UE. The maximum transmission power may be determined based on the pathloss measurement and/or the maximum tolerable interference to the base station. For example, the maximum transmission power for the access link may be a sum of the maximum tolerable interference to the base station and the pathloss measurement.

At step 1106, the relay UE communicates on the access link to the edge UE at a transmission power less than the determined maximum transmission power. In an aspect, the relay UE communicates on the access link to the edge UE using an uplink spectrum. The access link may have a pathloss of less than 100 dB.

Figure 12:
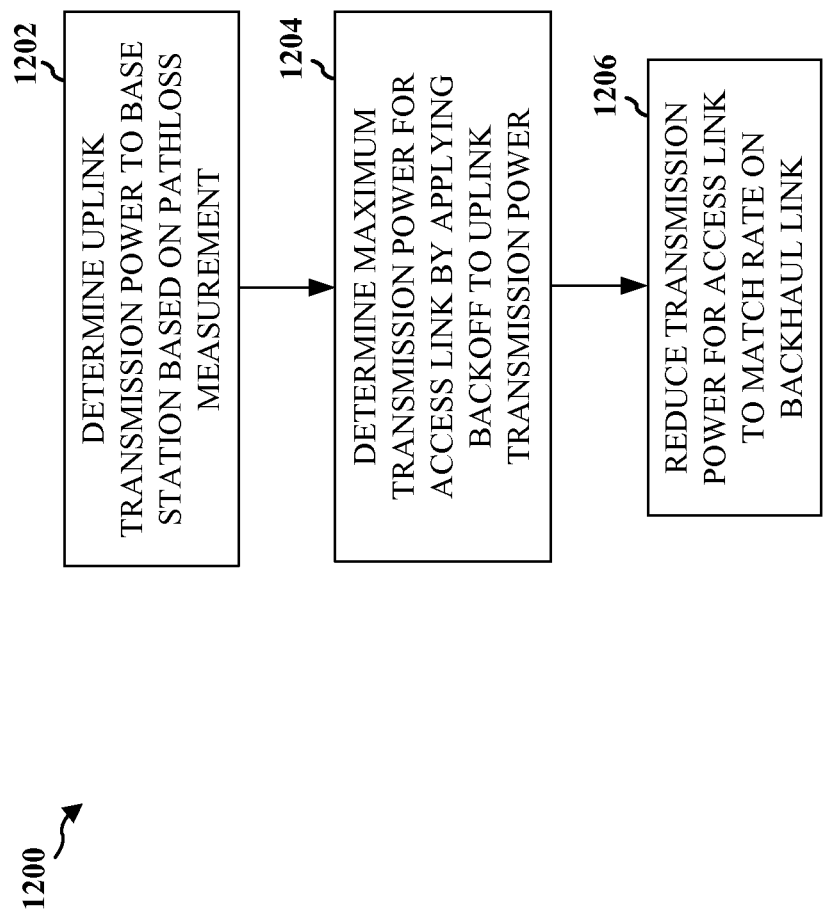
FIG. 12 is a flow chart of a method of wireless communication.

FIG. 12 is a flow chart 1200 of a method wireless communication further describing exemplary details of step 1104 of FIG. 11 above, wherein the maximum transmission power for the access link is determined. The method may performed by a relay, such as a relay UE. The method may also be performed by a UE on either end of an access link.

At step 1202, the relay UE determines an uplink transmission power to the base station based on the pathloss measurement. At step 1204, the relay UE determines the maximum transmission power for the access link by applying a backoff to the determined uplink transmission power. Applying the backoff may include subtracting at least 20 dB from the determined uplink transmission power. Thereafter, at step 1206, the relay UE reduces the transmission power for the access link to match a rate on a backhaul link.

Figure 13:
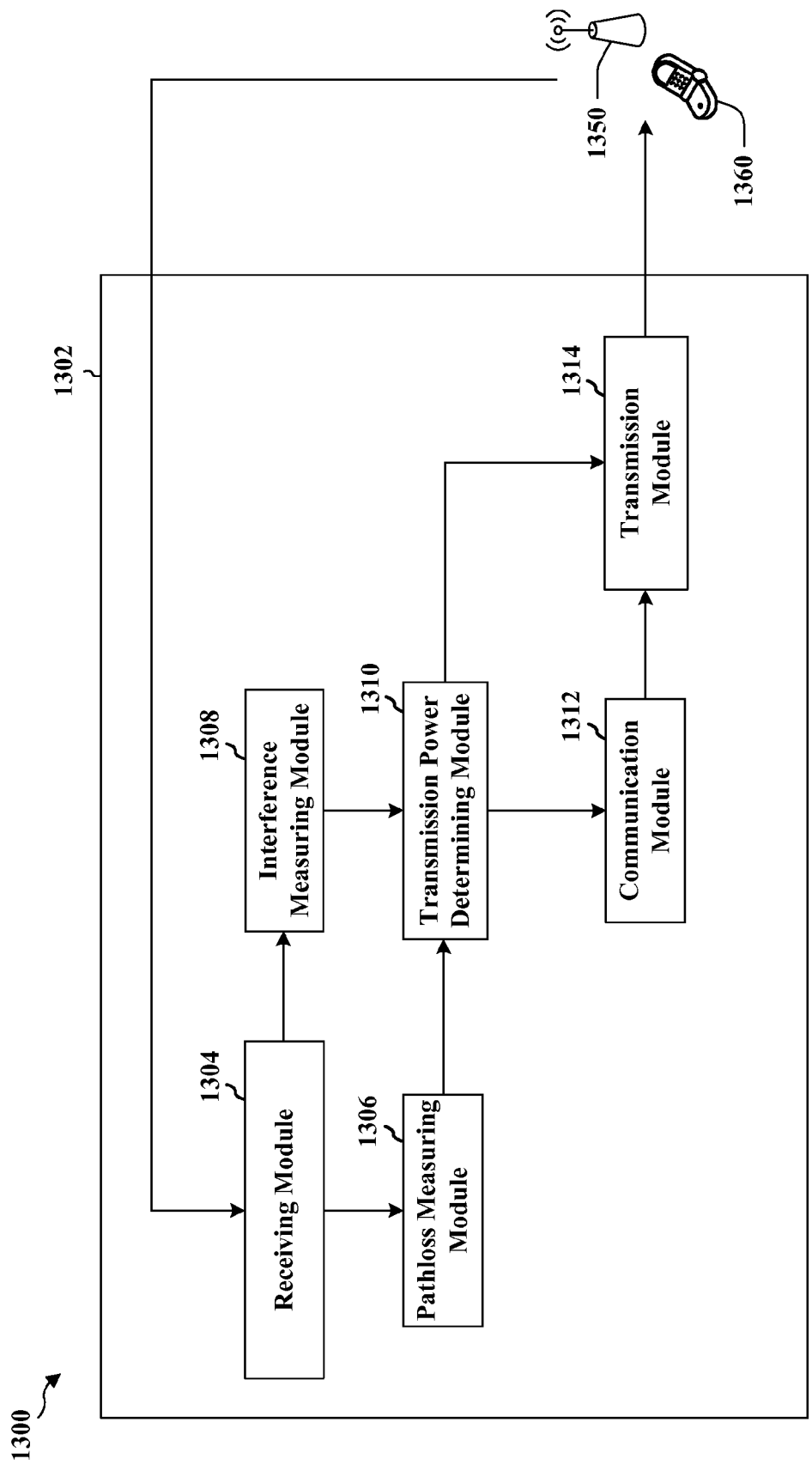
FIG. 13 is a conceptual data flow diagram illustrating the data flow between different modules/means/components in an exemplary apparatus.

FIG. 13 is a conceptual data flow diagram 1300 illustrating the data flow between different modules/means/components in an exemplary apparatus 1302. The apparatus may be a relay, such as a relay UE. The apparatus may also be a UE on either end of an access link. The apparatus includes a receiving module 1304, a pathloss measuring module 1306, an interference measuring module 1308, a transmission power determining module 1310, a communication module 1312, and a transmission module 1314.

The pathloss measuring module 1304 may obtain a pathloss measurement to a base station 1350. The interference measuring module 1308 may obtain a maximum tolerable interference to the base station 1350. In an aspect, the maximum tolerable interference may be obtained from the base station 1350 via the receiving module 1304.

The transmission power determining module 1310 determines a maximum transmission power for an access link to an edge UE 1360. The maximum transmission power may be determined based on the pathloss measurement and/or the maximum tolerable interference to the base station 1350. For example, the maximum transmission power for the access link may be a sum of the maximum tolerable interference to the base station and the pathloss measurement.

The communication module 1312 communicates on the access link to the edge UE 1360, via the transmission module 1314, at a transmission power less than the determined maximum transmission power. In an aspect, the communication module 1312 communicates on the access link to the edge UE 1360 using an uplink spectrum. The access link may have a pathloss of less than 100 dB.

In an aspect, the transmission power determining module 1310 determines an uplink transmission power to the base station 1350 based on the pathloss measurement. Accordingly, the transmission power determining module 1310 determines the maximum transmission power for the access link by applying a backoff to the determined uplink transmission power. Applying the backoff may include subtracting at least 20 dB from the determined uplink transmission power. Thereafter, the transmission power determining module 1310 may reduce the transmission power for the access link to match a rate on a backhaul link.

The apparatus may include additional modules that perform each of the steps of the algorithm in the aforementioned flow charts of FIGS. 11-12. As such, each step in the aforementioned flow charts of FIGS. 11-12 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 14:
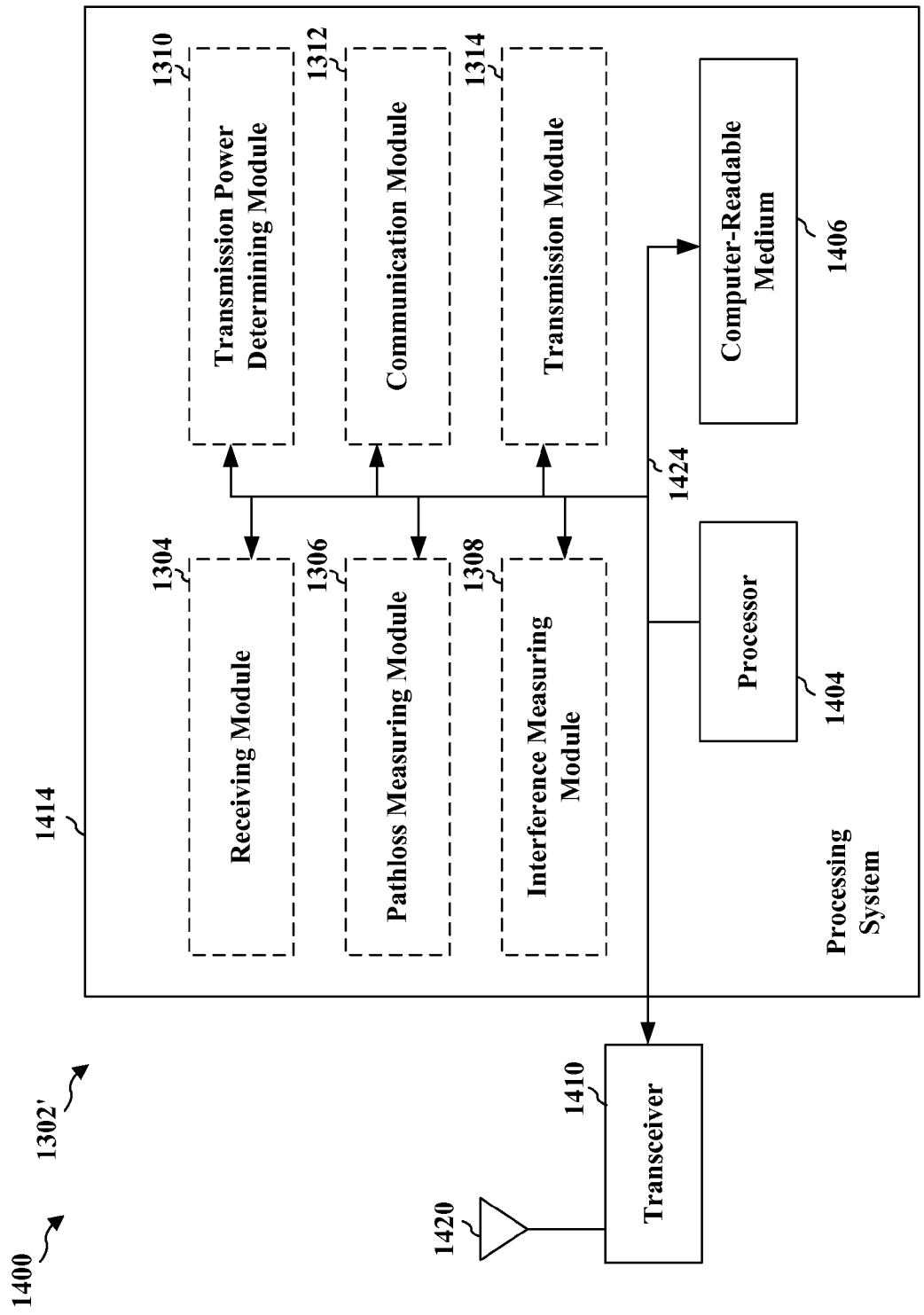
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware modules, represented by the processor 1404, the modules 1304, 1306, 1308, 1310, 1312, 1314 and the computer-readable medium 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The processing system 1414 includes a processor 1404 coupled to a computer-readable medium 1406. The processor 1404 is responsible for general processing, including the execution of software stored on the computer-readable medium 1406. The software, when executed by the processor 1404, causes the processing system 1414 to perform the various functions described supra for any particular apparatus. The computer-readable medium 1406 may also be used for storing data that is manipulated by the processor 1404 when executing software. The processing system further includes at least one of the modules 1304, 1306, 1308, 1310, 1312, and 1314. The modules may be software modules running in the processor 1404, resident/stored in the computer readable medium 1406, one or more hardware modules coupled to the processor 1404, or some combination thereof. The processing system 1414 may be a component of the UE 650 and may include the memory 660 and/or at least one of the TX processor 668, the RX processor 656, and the controller/processor 659.

In one configuration, the apparatus 1302/1302' for wireless communication includes means for obtaining at least one of a pathloss measurement to a base station or a maximum tolerable interference to the base station, means for determining a maximum transmission power for an access link to a user equipment (UE) based on the at least one of the pathloss measurement or the maximum tolerable interference to the base station, means for communicating on the access link to the UE at a transmission power less than the determined maximum transmission power, and means for reducing the transmission power for the access link to match a rate on the backhaul link.

The aforementioned means may be one or more of the aforementioned modules of the apparatus 1302 and/or the processing system 1414 of the apparatus 1302' configured to perform the functions recited by the aforementioned means. As described supra, the processing system 1414 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication at a user equipment (UE), comprising:
   obtaining, by the UE, at least one of a pathloss measurement to a base station or a maximum tolerable interference to the base station, wherein the UE is a relay having a backhaul link connected to the base station and an access link connected to a second UE, and wherein the backhaul link and the access link are allocated a same spectrum of an uplink to the base station;
   determining, by the UE, a maximum transmission power for the access link to the second UE based on the at least one of the pathloss measurement or the maximum tolerable interference to the base station such that transmission from the UE to the second UE on the access link does not interfere with concurrent transmission from the UE to the base station on the backhaul link; and
   communicating, concurrently, on the access link to the second UE at a transmission power less than the determined maximum transmission power and on the backhaul link to the base station.

2. The method of claim 1, wherein the determining the maximum transmission power for the access link comprises:
   determining a uplink transmission power to the base station based on the pathloss measurement; and
   determining the maximum transmission power for the access link by applying a backoff to the determined uplink transmission power.

3. The method of claim 1, wherein the maximum transmission power for the access link comprises a sum of the maximum tolerable interference to the base station and the pathloss measurement.

4. The method of claim 2, wherein the applying the backoff comprises subtracting at least 20 dB from the determined uplink transmission power.

5. The method of claim 2, further comprising reducing the transmission power for the access link to match a rate on the backhaul link.

6. The method of claim 1, wherein the communicating on the access link to the second UE is performed using the spectrum of the uplink.

7. The method of claim 1, wherein the access link has a pathloss less than 100 dB.

8. The method of claim 1, wherein the maximum tolerable interference is obtained from the base station.

9. An apparatus for wireless communication, wherein the apparatus is a user equipment (UE) comprising:
   means for obtaining, by the UE, at least one of a pathloss measurement to a base station or a maximum tolerable interference to the base station, wherein the UE is a relay having a backhaul link connected to the base station and an access link connected to a second UE, and wherein the backhaul link and the access link are allocated a same spectrum of an uplink to the base station;
   means for determining, by the UE, a maximum transmission power for the access link to the second UE based on the at least one of the pathloss measurement or the maximum tolerable interference to the base station such that transmission from the UE to the second UE on the access link does not interfere with concurrent transmission from the UE to the base station on the backhaul link; and
   means for communicating, by the UE concurrently, on the access link to the second UE at a transmission power less than the determined maximum transmission power and on the backhaul link to the base station.

10. The apparatus of claim 9, wherein the means for determining the maximum transmission power for the access link is configured to:
    determine a uplink transmission power to the base station based on the pathloss measurement; and
    determine the maximum transmission power for the access link by applying a backoff to the determined uplink transmission power.

11. The apparatus of claim 9, wherein the maximum transmission power for the access link comprises a sum of the maximum tolerable interference to the base station and the pathloss measurement.

12. The apparatus of claim 10, wherein the applying the backoff comprises subtracting at least 20 dB from the determined uplink transmission power.

13. The apparatus of claim 10, further comprising means for reducing the transmission power for the access link to match a rate on the backhaul link.

14. The apparatus of claim 9, wherein the communicating on the access link to the second UE is performed using the spectrum of the uplink.

15. The apparatus of claim 9, wherein the access link has a pathloss less than 100 dB.

16. The apparatus of claim 9, wherein the maximum tolerable interference is obtained from the base station.

17. An apparatus for wireless communication, wherein the apparatus is a user equipment (UE) comprising:
a processing system configured to:
obtain, by the UE, at least one of a pathloss measurement to a base station or a maximum tolerable interference to the base station, wherein the UE is a relay having a backhaul link connected to the base station and an access link connected to a second UE, and wherein the backhaul link and the access link are allocated a same spectrum of an uplink to the base station;
determine, by the UE, a maximum transmission power for the access link to the second UE based on the at least one of the pathloss measurement or the maximum tolerable interference to the base station such that transmission from the UE to the second UE on the access link does not interfere with concurrent transmission from the UE to the base station on the backhaul link; and
communicate, by the UE concurrently, on the access link to the second UE at a transmission power less than the determined maximum transmission power and on the backhaul link to the base station.

18. The apparatus of claim 17, wherein the processing system configured to determine the maximum transmission power for the access link is further configured to:
determine a uplink transmission power to the base station based on the pathloss measurement; and
determine the maximum transmission power for the access link by applying a backoff to the determined uplink transmission power.

19. The apparatus of claim 17, wherein the maximum transmission power for the access link comprises a sum of the maximum tolerable interference to the base station and the pathloss measurement.

20. The apparatus of claim 18, wherein the applying the backoff comprises subtracting at least 20 dB from the determined uplink transmission power.

21. The apparatus of claim 18, the processing system further configured to reduce the transmission power for the access link to match a rate on the backhaul link.

22. The apparatus of claim 17, wherein the communicating on the access link to the second UE is performed using the spectrum of the uplink.

23. The apparatus of claim 17, wherein the access link has a pathloss less than 100 dB.

24. The apparatus of claim 17, wherein the maximum tolerable interference is obtained from the base station.

25. A computer program product of a user equipment (UE), comprising:
a non-transitory computer-readable medium comprising code for:
obtaining, by the UE, at least one of a pathloss measurement to a base station or a maximum tolerable interference to the base station, wherein the UE is a relay having a backhaul link connected to the base station and an access link connected to a second UE, and wherein the backhaul link and the access link are allocated a same spectrum of an uplink to the base station;
determining, by the UE, a maximum transmission power for the access link to the second UE based on the at least one of the pathloss measurement or the maximum tolerable interference to the base station such that transmission from the UE to the second UE on the access link does not interfere with concurrent transmission from the UE to the base station on the backhaul link; and
communicating, by the UE concurrently, on the access link to the second UE at a transmission power less than the determined maximum transmission power and on the backhaul link to the base station.

26. The computer program product of claim 25, wherein the code for determining the maximum transmission power for the access link is configured to:
determine a uplink transmission power to the base station based on the pathloss measurement; and
determine the maximum transmission power for the access link by applying a backoff to the determined uplink transmission power.

27. The computer program product of claim 25, wherein the maximum transmission power for the access link comprises a sum of the maximum tolerable interference to the base station and the pathloss measurement.

28. The computer program product of claim 26, wherein the applying the backoff comprises subtracting at least 20 dB from the determined uplink transmission power.

29. The computer program product of claim 26, the non-transitory computer-readable medium further comprising code for reducing the transmission power for the access link to match a rate on the backhaul link.

30. The computer program product of claim 25, wherein the communicating on the access link to the second UE is performed using the spectrum of the uplink.

31. The computer program product of claim 25, wherein the access link has a pathloss less than 100 dB.

32. The computer program product of claim 25, wherein the maximum tolerable interference is obtained from the base station.

* * * * *